Figure 1:
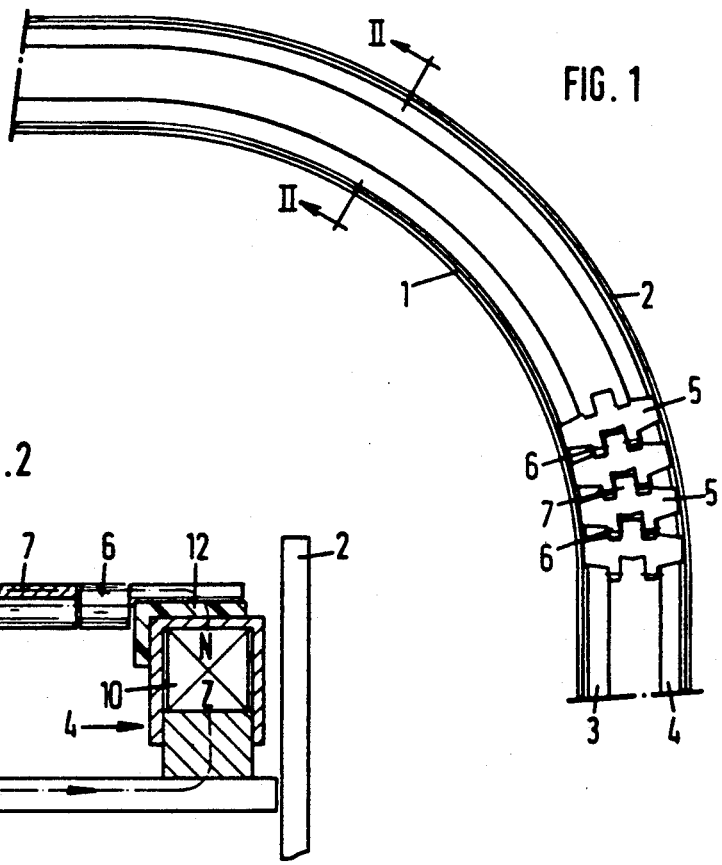

United States Patent [19]

Wallaart

[11] Patent Number: 5,027,942
[45] Date of Patent: Jul. 2, 1991

[54] CHAIN CONVEYOR

[76] Inventor: Jacobus J. Wallaart, Esdoornstraat 41, 's-Gravenzande, Netherlands

[21] Appl. No.: 376,960

[22] Filed: Jul. 6, 1989

Related U.S. Application Data

[63] Continuation of Ser. No. 159,693, Feb. 17, 1988, abandoned, which is a continuation of Ser. No. 918,670, Oct. 15, 1986, abandoned, which is a continuation of Ser. No. 701,104, Feb. 12, 1985, abandoned, which is a continuation of Ser. No. 242,334, Mar. 10, 1981, abandoned, which is a continuation of Ser. No. 971,523, Dec. 20, 1978, abandoned.

[51] Int. Cl.[5] .............................................. B65G 23/18
[52] U.S. Cl. .................................. 198/805; 198/690.1
[58] Field of Search ................... 198/690.1, 805, 837, 198/841, 852

[56] References Cited

U.S. PATENT DOCUMENTS

| 2,884,118 | 4/1959 | Williams | 198/852 |
| 3,581,873 | 6/1971 | Spodig | 198/690 |
| 3,964,800 | 6/1976 | Grimes et al. | 198/841 X |
| 3,980,173 | 9/1976 | Riggs | 198/805 X |

Primary Examiner—H. Grant Skaggs
Assistant Examiner—James R. Bidwell

[57] ABSTRACT

A chain conveyor comprising a chain movable over a track having one or more bends therein, comprising chain links having a substantially rectangular carrying surface with adjacent chain links in the chain being hinged together, and comprising a magnetic field generator at least in the outside bend zones of the track, and wherein the chain links are made of magnetizable material.

5 Claims, 1 Drawing Sheet

U.S. Patent     July 2, 1991     5,027,942

CHAIN CONVEYOR

This is a continuation of application Ser. No. 07/159,693 filed on Feb. 17, 1988 which is a continuation of Ser. No. 06/918,670 filed 10/15/86; which is a continuation of Ser. No. 06/242,334 filed 3/10/81; which is a continuation of Ser. No. 05/971,523 filed 12/20/78, all abandoned.

This invention relates to a chain conveyor comprising a chain movable over a track with one or more bends and composed of links having a substantially rectangular load supporting surface, adjacent links in the chain being hinged together. Such conveyors, designed for the transportation of bottles, tins and like containers are known, for example, from U.S. Pat. No. 3,262,550. In these, in order to prevent that, in use, owing to the tensile force in the chain, the chain links are lifted off the track on the outside of a bend, guide surfaces are formed on the chain links below their carrying surface, which guide surfaces diverge away from the carrying surface and, in bends, cooperate with corresponding guide surfaces provided in the vicinity of the track.

Such mechanical means for keeping a conveyor chain flat on its track in a bend have a number of drawbacks. The fact is that, in addition to the inevitable guide means on the bend sections of the track, they require, in one way or another, the formation of laterally projecting or inclined guide surfaces on all chain links. In particular in the case of metallic links, this will require an additional operation which makes the links relatively expensive. In addition, however, the links are considerably weakened. For tracks of chain conveyors of the subject type have been standardized to a great extent, that is to say, in practice the shortest distance between the two rails constituting the track has a fixed value, namely, approximately 44 mm. The hinging connection between adjacent links of the chain is realized by means of a hinge pin embraced by two spaced eyes connected to one link and an eye of an adjacent link situated centrally between said two spaced eyes. Naturally, in order that the chain may be moved through a bend, the hinge connection must permit relative pivoting movements of links in the plane of transportation.

In the chain links described in U.S. Pat. No. 3,262,550, the lateral end faces of the outer eyes of each hinge are formed as guide surfaces diverging downwardly away from the carrying surface, so that the bottom part of the hinge, i.e. the part of the hinge remote from the carrying surface is the broadest. Accordingly, for the hinge to pass between the rails of the track in the straight portions of the latter, the broadest part of the hinge must not be broader than approximately 42 mm. This means, however, that at the point of connection, that is to say at the point of the force transmitting connection of the hinge to the carrying surface of the adjacent link, the hinge is less than 42 mm wide. In practice, compared with chains designed exclusively for straight paths, which therefore do not require any guide surfaces for keeping the chain flat in any bends, this involves a weakening of approximately 20% with regard to the maximum permissible tensile force in the chain.

Another drawback of mechanical chain guides of the subject type, in which, in the bends, in one way or another, a guide surface of each chain link engages under a corresponding guide surface of the track, is that contaminations, such as grit from broken bottles, land on the rails or find their way in between the guide surfaces and cause damage to the surfaces concerned, especially if these are made of soft synthetic plastics materials, selected for their low-friction characteristics.

It is an object of the present invention to avoid the above and other drawbacks.

According to the present invention, means are provided for generating a magnetic field at least in the outside bend zones of the track, and the chain links are made of magnetizable material.

Accordingly, in a chain conveyor according to the present invention, the chain links are kept flat on the track in bends by magnetic forces without particular measures being required in making the links for forming guide surfaces, and, as far as the design of the track is concerned, the hinge eyes may have an optimum width. In the case of dirt being accumulated on the track, the chain is lifted over such dirt, but remains under the influence of the magnetic field, so that tilting and derailment off the track is prevented. After the passage of the contaminations, the chain is again firmly drawn onto its track.

Although electromagnets may be used, it has been found in practice that a good anti-tilt effect can be achieved with permanent magnets and chain links of ferromagnetic material.

Preferably, magnets are provided both in the inner bend and in the outside bend, which magnets are connected at the bottom side of the track by a field strip, that is to say, a strip of high magnetic permeability, so that a closed force field is formed.

In a preferred embodiment of the invention, removable magnet units are mounted in the track, each of said units consisting of a field strip extending across the track width and permanent magnets on both the inner bend side and outside bend side and both above and below the strip, the magnets disposed below the field strip extending in a track for guiding the return run of the conveyor chain. The location and intensity of the magnetic field can thus be selected to suit requirements. As the magnets on the bottom side of the field strip guide the return run of the chain, hold-down rollers, commonly employed to prevent sagging and/or tilting of the return run, can be omitted.

The invention also relates to a so-called flexible chain designed for use in a chain conveyor as described hereinbefore, with a track comprising two spaced parallel rails.

Such a chain, comprising chain links having a substantially rectangular carrying surface, with adjacent links in the chain being hinged together by a hinge pin embraced by two spaced eyes connected with one of the links and an eye situated between the spaced eyes and connected to the other link, the carrying surfaces, the hinge pins and the hinge eyes being designed so that the chain is capable of bending not only about the hinge pins, but also in the plane of transportation formed by the carrying surfaces of the successive links, while further at the underside of the carrying surfaces guide surfaces extend downwardly, which in cooperation with guide surfaces formed on the track rails provide for lateral guidance of the chain relative to the rails, as known per se from U.S. Pat. No. 3,262,550, is characterized in that at least the carrying surfaces of the chain links are made of magnetizable material, and in that the guide surfaces under the carrying surfaces extend downwardly at right angles to the carrying surfaces.

Preferably, the guide surfaces are formed by the lateral outer surfaces of the outer hinge eyes, so that the hinges may be of optimum width (approximately 42 mm) throughout their height, and the flexible chain according to the invention accordingly is not weakened for the sake of bend guidance in any way whatsoever.

Figure 2:
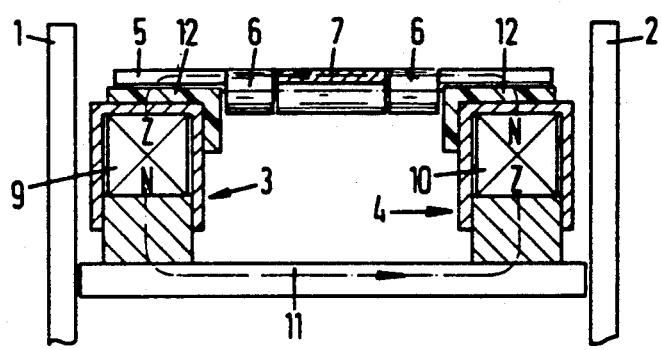
Figure 3:
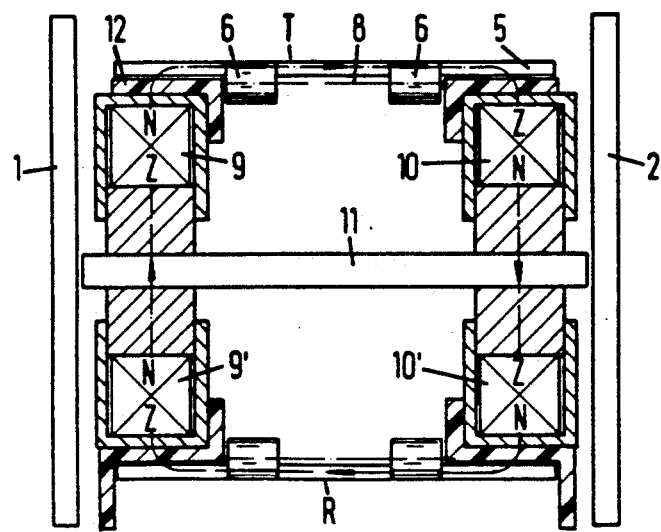

Some embodiments of the invention will now be described, by way of example, with reference to the accompanying drawings, in which FIG. 1 is a plan view of a bend section of a conveyor according to the present invention;

FIG. 2 is a cross-sectional view according to the arrows II—II of FIG. 1, on an enlarged scale; and FIG. 3 is a cross-sectional view similar to FIG. 2, and showing a variant embodiment of the invention.

Referring to the drawings, there is shown a chain conveyor comprising upstanding side walls 1 and 2, between which is mounted a track composed of rails 3 and 4. Resting on the rails is a link chain, composed of chain links 5, each provided on one side with spaced hinge eyes 6 and on the other with a centrally situated hinge eye 7. Hinge eyes 6 and 7 each embrace a hinge pin 8.

In the embodiment shown in FIGS. 1 and 2, rails 3 and 4 are provided, at least in the bend sections, with permanent magnets 9 and 10, which may be formed as elongated permanent magnets, each extending throughout the bend section, or, alternatively, an array of short magnet pieces may be provided both in the inner bend and in the outside bend. Magnets 9 and 10 are accommodated within rails 3 and 4, which are hollow, and connected at their underside by a field strip 11, that is to say, a strip of a material having a high magnetic permeability, such as soft iron, so that, together with the chain of magnetizable material, resting on rails 3 and 4, a closed force field is formed as indicated by dash-dot lines.

The horizontal guidance of the chain is effected by hinge eyes 6, 7 being confined between rails 3 and 4, and the vertical "guidance" is effected by magnets 9 and 10.

In order to reduce the resistance which the chain has to overcome in its movement over the rails, a plastics moulding 12 may be provided on each rail. Good results are obtained with a high molecular weight polyethylene, a soft and wear resistant material.

In a preferred embodiment of the invention, illustrated in FIG. 3, the magnetic chain guide for each bend section is composed of one or more lengths of a unit consisting of a field strip 11' with magnets at both the upper and the underside, namely, magnets 9 and 9' at the inner bend side and magnets 10 and 10' at the outside bend. Here again, a closed force field can be provided by a proper selection of the polarity of the magnets, but not in this instance through field strip 11' but at the underside by return run R and at the top by the pulling run T of the chain.

It is clear that various variants are possible within the scope of the present invention. They have all in common, however, that the chain links are capable of transmitting a greater pulling force compared with prior chain links designed for traversing paths having bends therein, with otherwise the same chain size.

As the drive of the chain does not form part of the present invention, this will not be described herein. It is possible, for example, to use a conventional drive employing sprockets engaging with the chain links.

I claim:

1. An improved chain conveyor for conveying non-magnetizable material, said chain conveyor comprising a chain, a guide track and guide means, said chain comprising a plurality of chain links, each of said links having a substantially rectangular carrying surface made of ferromagnetic material said chain links being interconnected, one with the other, so that the rectangular carrying surfaces on adjacent interconnected links are contiguous, planar and horizontal, said guide track contacting said chain links and guiding said chain and said planar carrying surfaces along an upper path and a lower path, the lower path being traversed by a return run of the chain, said upper path and said lower path each having at least one upper path bend and one lower path bend opposite each other, and said guide means maintaining the carrying surfaces of the chain in a horizontal plane while said chain moves through said upper path bend and said lower path bend, the improvement comprising: a magnetic field generating means comprising permanent magnets positioned at said upper path bend, said magnetic field generating means and the ferromagnetic material of said chain links passing through said bend forming a magnetic circuit which maintains said chain link in said bend in flat, contiguous contact with said guide track and in planar, horizontal alignment with adjoining interconnected chain links and a soft wear resistant material between said guide track and said links for contacting said links as said links are drawn through said bend, said chain links having adjacent chain links hinged together by a hinge pin embraced by two spaced eyes connected to one of said links and an eye situated between said spaced eyes and connected to the other link, the carrying surfaces, the hinge pins and the hinge eyes being designed so that the chain is capable of bending not only about the hinge pins, but also in the plane of transportation formed by the carrying surfaces of the successive links, while furthermore at the underside of the carrying surfaces guide surfaces extend downwardly which in cooperation with guide surfaces formed on the track rails provide for lateral guidance of the chain relative to the rails, the guide surfaces under the carrying surfaces extending downwardly at right angles to the carrying surfaces of the chain links.

2. An improved chain conveyor as claimed in claim 1, in which said guide track at said at least one bend includes an inner bend and an outside bend, a magnetic field generating means in said inner bend and in said outside bend, said magnetic field generating means being connected at the bottom side of said track under said chain conveyor by a field strip having high magnetic permeability.

3. An improved chain conveyor as claimed in claim 2, in which said magnetic field generating means and field strip comprises removable magnet units mounted in said track, each of said units comprising a field strip extending across the track width with permanent magnets at both an inner bend and an outside bend of said conveyor guide track and both above and below said field strip, the magnets situated below the field strip extending in a track designed for guiding the return run of the conveyor chain.

4. An improved chain as claimed in claim 1, wherein the guide surfaces are formed by the lateral outer surfaces of the outer hinge eyes.

5. An improved chain conveyor for conveying non-magnetizable material, said chain conveyor comprising a chain, a guide track and guide means, said chain comprising a plurality of chain links, each of said links having a substantially rectangular carrying surface made of ferromagnetic material said chain links being interconnected, one with the other, so that the rectangular carrying surfaces on adjacent interconnected links are contiguous, planar and horizontal, said guide track contacting said chain links and guiding said chain and said planar carrying surfaces along an upper path and a lower path perpendicular to the plane of said links, the lower path being traversed by a return run of the chain, said upper path and said lower path each having at least one upper path bend and one lower path bend opposite each other, and said guide means maintaining the carrying surfaces of the chain in a horizontal plane while said chain moves through said upper path bend and said lower path bend, the improvement comprising: a magnetic field generating means comprising permanent magnets positioned at said upper path bend, said magnetic field generating means and the ferromagnetic material of said chain links passing through said bend forming a magnetic circuit which maintains said chain link in said bend in flat, contiguous contact with said guide track and in planar, horizontal alignment with adjoining interconnected chain links and a soft wear resistant material between said guide track and said links for contacting said links as said links are drawn through said bend, said chain links having adjacent chain links hinged together by a hinge pin embraced by two spaced eyes connected to one of said links and an eye situated between said spaced eyes and connected to the other link, the carrying surfaces, the hinge pins and the hinge eyes being designed so that the chain is capable of bending not only about the hinge pins, but also in the plane of transportation formed by the carrying surfaces of the successive links, while furthermore at the underside of the carrying surfaces guide surfaces extend downwardly which in cooperation with guide surfaces formed on the track rails provide for lateral guidance of the chain relative to the rails, the guide surfaces under the carrying surfaces extending downwardly at right angles to the carrying surfaces of the chain links plus, there being provided a closed force loop through the chain of the return run, the magnets at the inner bend side, the chain of the upper run and the magnets at the outer bend side.

* * * * *

UNITED STATES PATENT AND TRADEMARK OFFICE
CERTIFICATE OF CORRECTION

PATENT NO. : 5,027,942

DATED : July 2, 1991

INVENTOR(S) : Jacobus J. Wallaart

It is certified that error appears in the above-identified patent and that said Letters Patent is hereby corrected as shown below:

On the title page, insert the following:

--[73] Assignee:  M.C.C Nederland B.V. SGravenzande, The Netherlands--.

Signed and Sealed this

Second Day of March, 1993

Attest:

STEPHEN G. KUNIN

*Attesting Officer*      Acting Commissioner of Patents and Trademarks